(12) United States Patent
Korcz et al.

(10) Patent No.: US 10,958,053 B2
(45) Date of Patent: Mar. 23, 2021

(54) ADJUSTABLE SUPPORT BRACKET FOR ELECTRICAL DEVICES

(71) Applicant: Hubbell Incorporated, Shelton, CT (US)

(72) Inventors: Krzysztof Korcz, Grainger, IN (US); Steven J. Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 263 days.

(21) Appl. No.: 15/449,653

(22) Filed: Mar. 3, 2017

(65) Prior Publication Data

US 2017/0256928 A1 Sep. 7, 2017

Related U.S. Application Data

(60) Provisional application No. 62/302,926, filed on Mar. 3, 2016.

(51) Int. Cl.
*H02G 3/12* (2006.01)
*H02G 3/06* (2006.01)
*H02G 3/08* (2006.01)

(52) U.S. Cl.
CPC .............. *H02G 3/125* (2013.01); *H02G 3/06* (2013.01); *H02G 3/081* (2013.01)

(58) Field of Classification Search
CPC ........ H02G 3/123; H02G 3/125; H02G 3/126; H02G 3/281; H02G 3/381; Y10S 248/906; F16M 13/027; E04B 9/006
USPC .................................... 248/200.1, 298.1, 906
See application file for complete search history.

(56) References Cited

U.S. PATENT DOCUMENTS

| 1,982,957 | A | * | 12/1934 | Knell | H02G 3/126 180/68.5 |
| 2,812,918 | A | * | 11/1957 | Longino | G09F 1/10 248/298.1 |
| 2,933,549 | A | * | 4/1960 | Antonucci | H02G 3/126 174/63 |
| 4,134,636 | A | | 1/1979 | Kleinatland | |
| 4,634,015 | A | | 1/1987 | Taylor | |
| 5,042,673 | A | | 8/1991 | McShane | |
| 5,224,673 | A | | 7/1993 | Webb | |
| 5,386,959 | A | * | 2/1995 | Laughlin | H02B 1/015 248/200.1 |

(Continued)

OTHER PUBLICATIONS

PCT/US2017/020761 International Search Report and Written Opinion dated May 26, 2017 (16 pages).

*Primary Examiner* — Jonathan Liu
*Assistant Examiner* — Guang H Guan
(74) *Attorney, Agent, or Firm* — Michael Best & Friedrich, LLP

(57) ABSTRACT

A bracket for supporting at least one electrical device includes a pair of legs engaging one another in an interlocking manner. Each of the legs includes an end portion and a pair of rails connected to the associated end portion, and each end portion is configured to be secured to a support member. Each pair of rails extends from the associated end portion in a parallel orientation, and the rails are laterally spaced apart from one another. The pair of rails of one leg is coupled to the pair of rails of the other leg and the pair of rails of the one leg is slidable relative to the pair of rails of the other leg to change the distance between the end portions.

17 Claims, 6 Drawing Sheets

(56) References Cited

U.S. PATENT DOCUMENTS

| | | | |
|---|---|---|---|
| 5,505,419 A * | 4/1996 | Gabrius | F21V 21/04 |
| | | | 248/200.1 |
| 5,931,325 A | 8/1999 | Filipov | |
| 6,076,788 A * | 6/2000 | Akiyama | E04B 9/006 |
| | | | 248/200.1 |
| 6,209,836 B1 | 4/2001 | Swanson | |
| 6,666,419 B1 | 12/2003 | Vrame | |
| 6,803,521 B2 * | 10/2004 | Vrame | H02G 3/123 |
| | | | 174/50 |
| 6,820,760 B2 | 11/2004 | Wegner | |
| 7,025,314 B1 | 4/2006 | Thomas et al. | |
| 7,036,782 B2 * | 5/2006 | Cheatham | H02G 3/125 |
| | | | 248/298.1 |
| 7,038,131 B1 | 5/2006 | Gretz | |
| 7,259,328 B1 | 8/2007 | Gretz | |
| 7,355,118 B1 | 4/2008 | Gretz | |
| 7,468,486 B2 | 12/2008 | Yan | |
| 7,531,743 B2 | 5/2009 | Johnson et al. | |
| 7,645,936 B2 | 1/2010 | Magno, Jr. | |
| 8,076,577 B2 | 12/2011 | Mango, Jr. et al. | |
| 8,985,364 B2 * | 3/2015 | Gagne | H02G 3/36 |
| | | | 220/3.3 |
| 9,397,491 B2 * | 7/2016 | Birli | H02G 3/125 |
| 9,553,438 B2 | 1/2017 | Korcz | |
| 9,564,744 B2 * | 2/2017 | Jaffari | H02G 3/128 |
| 2010/0270446 A1 | 10/2010 | Phillips | |
| 2015/0001357 A1 | 1/2015 | Jaffari et al. | |
| 2017/0256928 A1 * | 9/2017 | Korcz | H02G 3/125 |

* cited by examiner

ADJUSTABLE SUPPORT BRACKET FOR ELECTRICAL DEVICES

CROSS-REFERENCE TO RELATED APPLICATION

This application claims the benefit of prior-filed, U.S. Provisional Patent Application No. 62/302,926, filed Mar. 3, 2016, the entire contents of which are hereby incorporated by reference.

BACKGROUND

The present disclosure relates to mounting brackets, and particularly to mounting brackets for supporting electrical boxes and devices.

Electrical devices such as, but not limited to, electrical outlets, switches, and others are typically installed in a wall or ceiling. A gang or junction box may be secured to a stud or support beam inside of the wall or ceiling, or may be secured to a bracket positioned between adjacent studs. The electrical device is then secured in the box in electrical communication with one or more electrical conductors so that the electrical device extends or protrudes from the wall or ceiling. Any exposed portions of the electrical conductor and its connection to the electrical device may be shielded within the box.

SUMMARY

In one aspect, a bracket for supporting at least one electrical device includes a first portion and a second portion. The first portion includes a first flange and a pair of first rails. The first flange is configured to be secured to a support member. The first rails extend from the first flange and are spaced apart from one another. The first rails are oriented parallel to one another. The second portion includes a second flange and a pair of second rails. The second flange is configured to be secured to another support member. The second rails extend from the second flange and are spaced apart from one another. The second rails are oriented parallel to one another. The second rails engage and are coupled to the first rails such that the second rails are slidable relative to the first rails.

In another aspect, a bracket for supporting at least one electrical device includes a pair of legs engaging one another in an interlocking manner. Each of the legs includes an end portion and a pair of rails connected to an associated end portion, and each end portion is configured to be secured to a support member. Each pair of rails extends from the associated end portion in a parallel orientation, and the rails are laterally spaced apart from one another. The pair of rails of one leg is coupled to the pair of rails of the other leg and the pair of rails of the one leg is slidable relative to the pair of rails of the other leg to change the distance between the end portions.

In yet another aspect, a method of forming a bracket for supporting at least one electrical device includes: forming a pair of elongated members, each elongated member including a first portion adjacent a first end, a second portion adjacent a second end opposite the first end, and a connecting portion positioned between the first portion and the second portion; deflecting the first portion of each elongated member relative to the connecting portion to form a first rail; deflecting the second portion of each elongated member relative to the connecting portion to form a second rail, each second rail oriented parallel to and spaced apart from the associated first rail; and interlocking the rails of the elongated members such that the rails are slidable relative to one another to adjust a distance between the connecting portions.

The above-described and other features and advantages of the present disclosure will be appreciated and understood by those skilled in the art from the following detailed description and drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
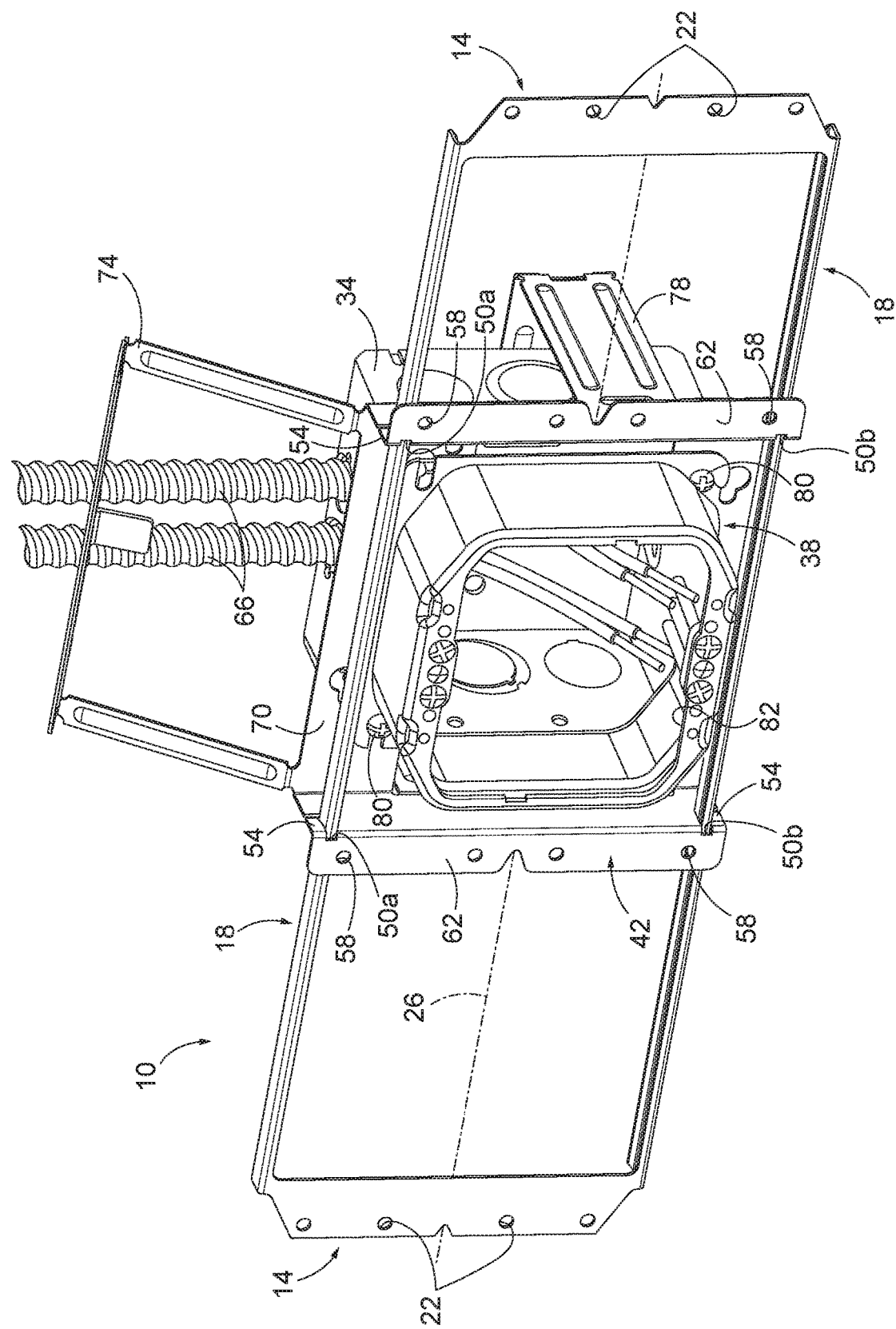
FIG. 1 is a perspective view of a bracket assembly, an electrical box, and a mud ring.

FIG. 1 shows a bracket 10 for supporting electrical devices (e.g., electrical receptacles, switches, etc.—not shown). The bracket 10 includes a pair of end portions 14 and a pair of side portions or rails 18 extending between the pair of end portions 14. The bracket 10 forms an open space between the end portions 14 and between the rails 18. Each end portion 14 may include holes 22 for coupling the end portion 14 to a support member or stud (not shown), such that the bracket 10 spans between two adjacent studs. A longitudinal axis 26 of the bracket 10 extends between the end portions 14.

The bracket 10 supports an electrical box 34 and a mud ring 38 for supporting an electrical receptacle (e.g., a receptacle, switch, outlet—not shown) relative to the electrical box 34. In the illustrated embodiment, the electrical box 34 and the mud ring 38 are supported on a mounting member 42 that is slidably coupled to the bracket 10. The mounting member 42 is slidable along the rails 18 in a direction parallel to the longitudinal axis 26 so that the mounting member 42 can be positioned in various locations along the longitudinal axis 26.

In the illustrated embodiment, the mounting member 42 includes a pair of upper slots 50a and a pair of lower slots 50b. The pair of upper slots 50a engages one of the bracket rails 18, and the pair of lower slots 50b engages the other of the bracket rails 18. The mounting member 42 further includes tabs 54, each of which is positioned adjacent one of the slots 50 in order to retain the respective rail 18 within the slot 50 and thereby retain the mounting member 42 on the bracket 10. Each tab 54 may be bent away to permit a rail 18 to be positioned in the slot 50 and then bent back into place to retain the rail 18. In some embodiments, once the mounting member 42 is positioned in a desired location, a threaded fastener (not shown) may be inserted through one or more holes 58 on side flanges 62 of the mounting member 42 adjacent the rail 18 such that at least an edge of the fastener contacts and engages the rail 18 to secure the mounting member 42 against movement relative to the bracket 10.

The electrical box 34 is positioned on a first or rear side of the mounting member 42 and receives electrical conduit 66. The electrical box 34 may be secured to a flange 70 of the mounting member 42. In addition, the electrical conduit 66 may be secured relative to the electrical box 34 by a first support arm 74 extending from an upper edge of the mounting member 42 and engaging an outer surface of the conduit 66. Second support arms 78 may extend along a depth of the electrical box 34 to abut and engage an inner wall surface (not shown) opposite a rear surface of the electrical box 34. The engagement between the opposite inner wall and the second support arms 78 provides a far side support, increasing the rigidity of the assembly and providing a reaction arm against forces exerted on the box 34 and bracket 10 during assembly.

The mud ring 38 is secured (e.g., by fasteners 80) to a second or forward side of the mounting member 42. The mud ring 38 includes an opening 82 for receiving an electrical device (e.g., receptacle or switch—not shown) in electrical communication with the conduit 66. In the illustrated embodiment, the mud ring 38 is a double gang mud ring, capable of receiving two electrical devices. In other embodiments, the mud ring 38 and electrical box 34 may accept a single device (single gang), or may be configured to receive a different number of devices. Also, in other embodiment, the electrical box 34 and mud ring 38 may be coupled to and supported by the bracket 10 in a different manner.

FIGS. 2-7 illustrate a bracket 210 according to another embodiment. The bracket 210 is similar to the bracket 10, and similar features are identified with similar reference numbers, plus 200.

Figure 2:
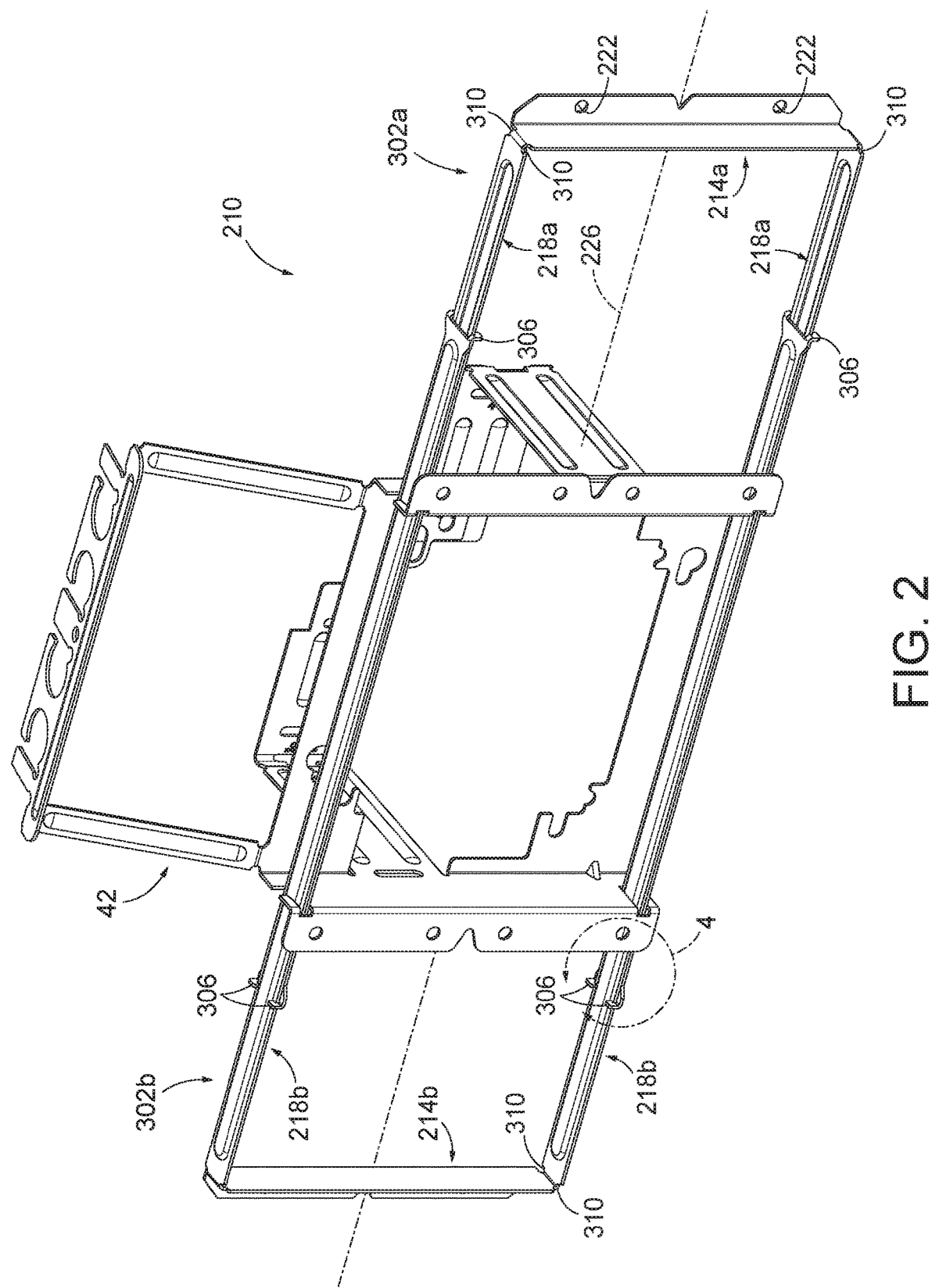
FIG. 2 is a perspective view of a bracket according to another embodiment.
Figure 3:
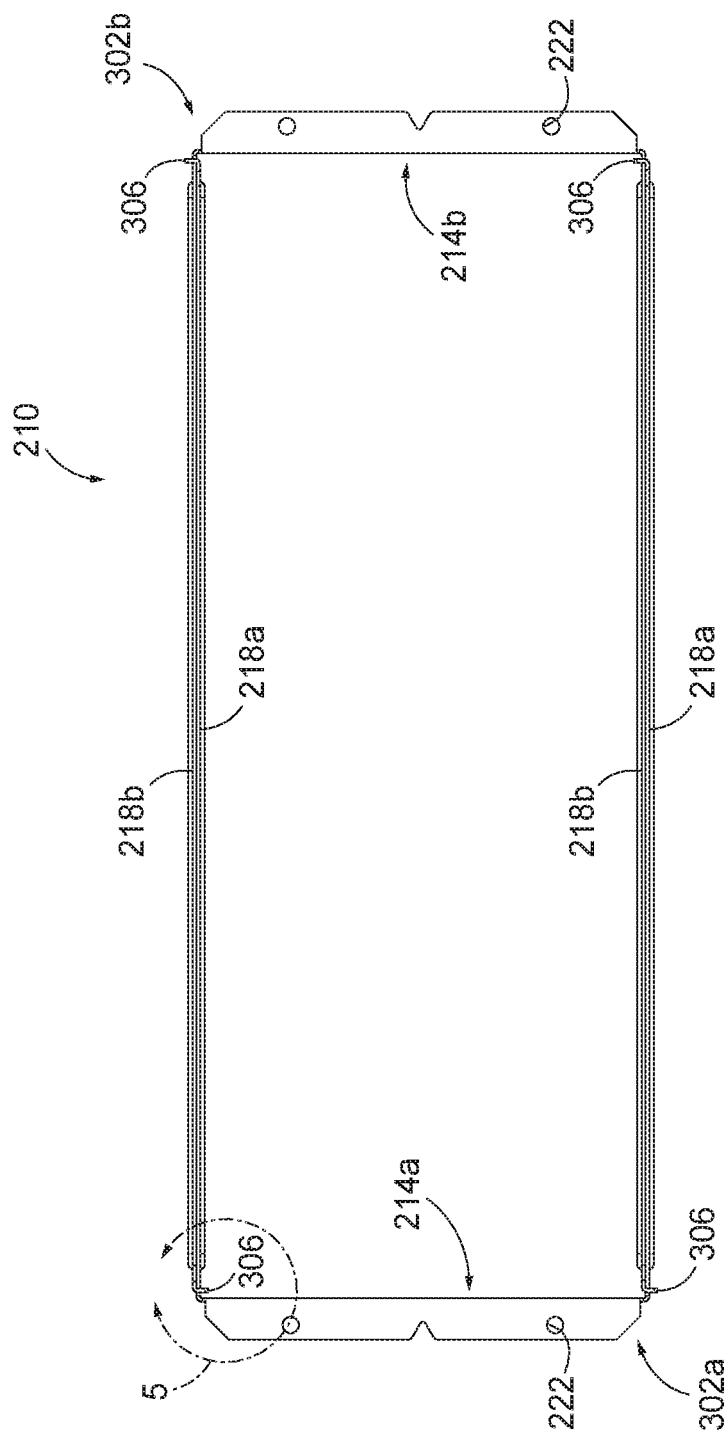
FIG. 3 is a plan view of the bracket of FIG. 2.
Figure 4:
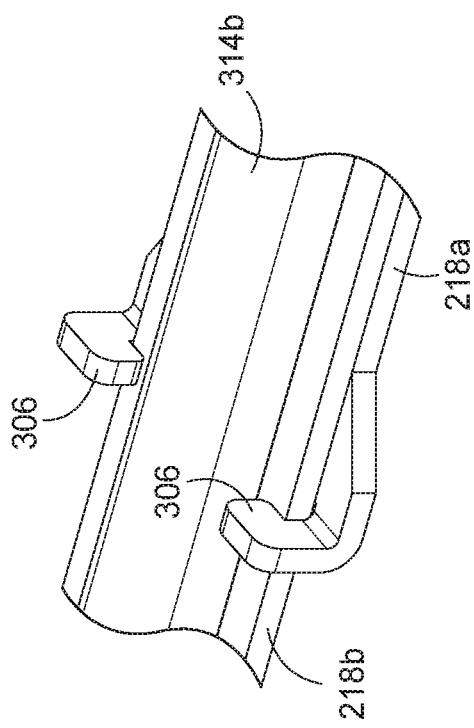
FIG. 4 is an enlarged perspective view of a portion of the bracket of FIG. 2.
Figure 5:
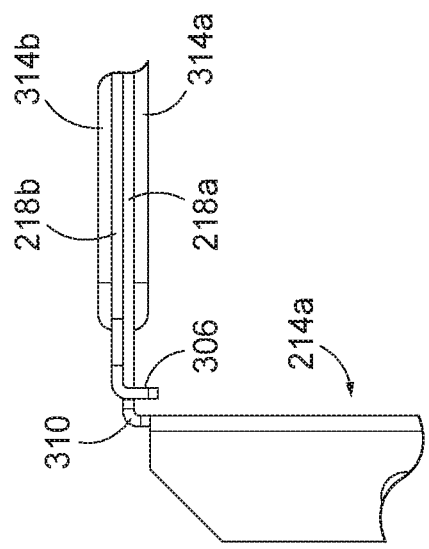
FIG. 5 is an enlarged side view of a portion of the bracket of FIG. 2.

As shown in FIGS. 2 and 3, the bracket 210 includes a pair of interlocking legs 302a, 302b that are movable relative to one another. Each leg 302 includes an end portion 214 (e.g., 214a, 214b) and a pair of rails 218 extending away from the end portion 214. The end portion 214 of each leg 302 may be coupled (e.g., by inserting a fastener through one or more holes 222) to a stud (not shown). As shown in FIGS. 4 and 5, the end of each rail 218 includes hooks or tabs 306 that are bent relative to the rail 218. The tabs 306 of one rail 218a extend around a side surface and over a portion of the mating rail 218b of the other leg 302b to interlock and retain the rails 218 relative to one another. Similarly, the tabs 306 of the rail 218b extend around and over a portion of the rail 218a to interlock and retain the rails 218. In some embodiments, cutouts or notches 310 (FIG. 2) may be formed at a connection between the end portions 214 and the rails 218; when the tabs 306 are aligned with the notches 310, the tabs 306 may pass through the notches 310 to permit the rails 218 to be uncoupled from one another.

The legs 302 may telescope or move relative to one another in a direction parallel to the bracket longitudinal axis 226 (FIG. 2) to change the distance between the end portions 214 and thereby accommodate different distances between adjacent studs. In some embodiments, the distance between the end portions 214 is adjustable between approximately 12 inches and approximately 22.5 inches. In other embodiments, the distance between the end portions 214 may be adjustable within a different range of lengths. The open center of the bracket 210 permits an electrical box 34 and mud ring 38 (FIG. 1) and, optionally, a mounting member 42 (FIG. 2) or other supplemental support bracket to be positioned at various locations within the opening along the length of the bracket 210.

In the illustrated embodiment, each rail 218 also includes an elongated protrusion 314 extending substantially along the length of the rail 218. The protrusion 314 may protrude from the surface of the respective rail 218 in a direction opposite the direction that the bent tabs 306 extend from the rail 218. Among other things, the protrusion 314 may provide additional rigidity for the rail 218. The protrusion 314 may be positioned between the tabs 306 retaining the rail 218, and the tabs 306 may slide along either side of the protrusion 314.

Figure 6:
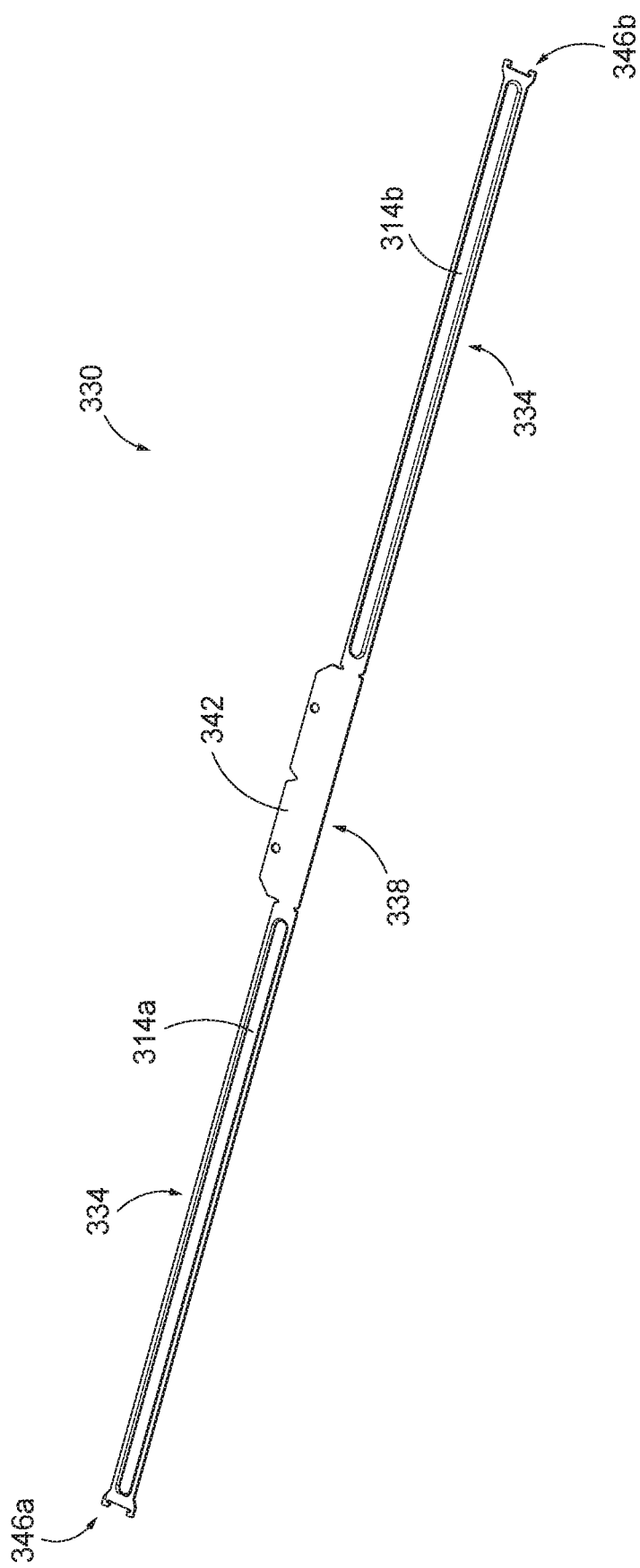
FIG. 6 is a perspective view of a leg of the bracket of FIG. 2 in an initial stage of manufacture.

FIG. 6 illustrates a blank 330 before being formed into one of the legs 302. The blank 330 is formed in an elongated strip having a first end and a second end. A rail portion 334 is formed adjacent each end, and a connecting portion 338 is positioned longitudinally between the two rail portions 334. The rail portions 334 and connecting portion 338 are formed in a common plane. In some embodiments, the blank 330 is formed from a stamped workpiece. A flange 342 extends laterally from one side of the connecting portion 338. A pair of opposing hooks 346 is formed on each end of the blank 330, with the hooks 346 curling inwardly toward one another. Elongated protrusions 314 are formed along the length of the rail portions 334. In the illustrated embodiment, the protrusions 314 protrude from the rail portions 338 in different directions from one another while the blank 330 is in the configuration illustrated in FIG. 6. Stated another way, one protrusion 314a extends downwardly while the other protrusion 314b extends upwardly.

Figure 7:
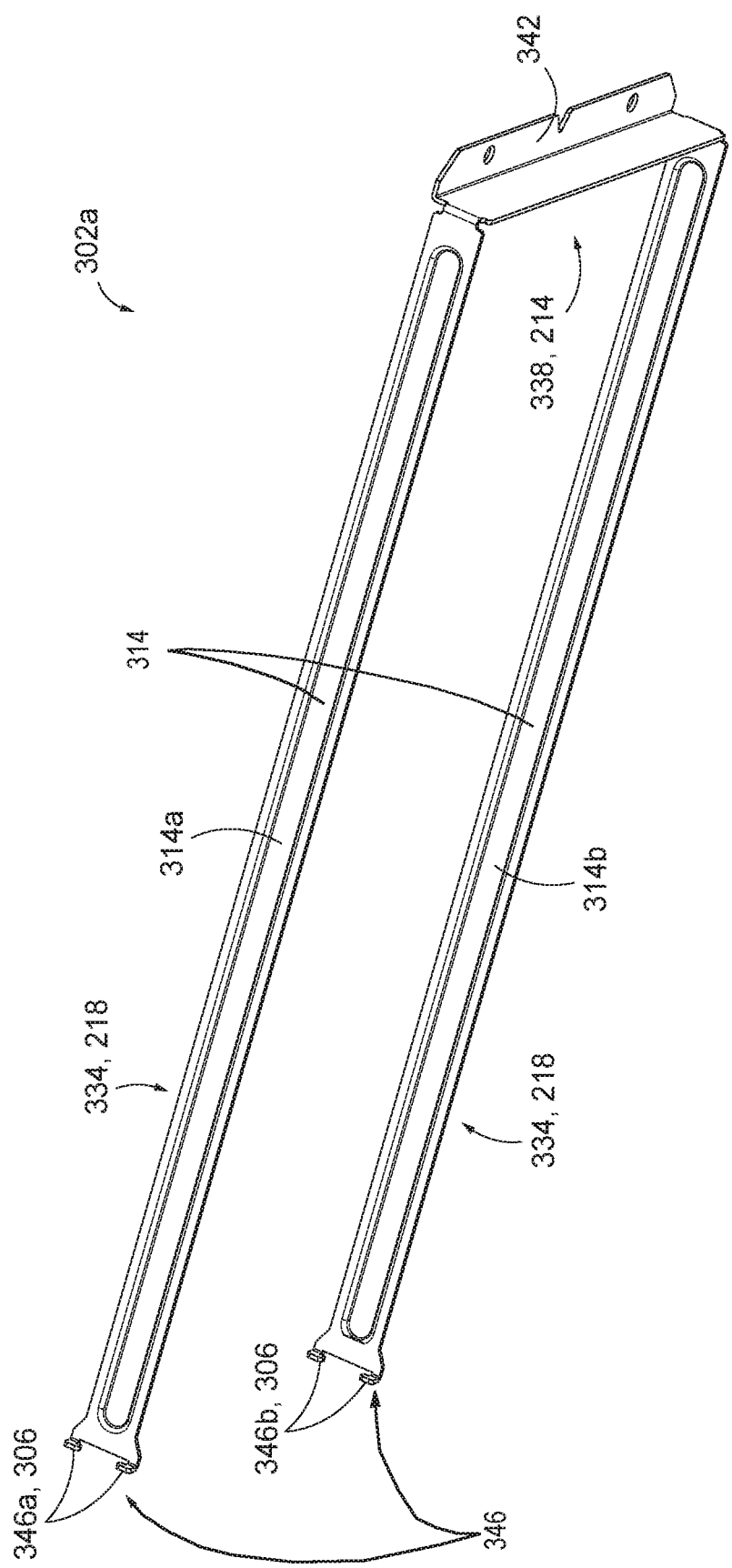
FIG. 7 is a perspective view of the leg of FIG. 6 in a final stage of manufacture.

As shown in FIG. 7, each pair of hooks 346 is deflected relative to the rail portions 334 at approximately 90 degrees. Each pair of hooks 346 is deflected away from the surface from which the adjacent protrusion 314 extends. That is, in the illustrated embodiment, one pair of hooks 346a is deflected upwardly while the other pair of hooks 346b is deflected downwardly. The flange 342 is deflected relative to the connecting portion 338 at approximately 90 degrees. The rail portions 334 are deflected relative to the connecting portion 338 at approximately 90 degrees and are deflected in a direction away from the flange 342. The rail portions 334 are spaced apart from one another and oriented parallel to one another, thereby generally forming a U-shape or C-shape. As a result of the deflection of both rail portions 334, the hooks 346a, 346b extend in the same direction. The connecting portion 338 and flange 342 thereby form the end portion 214 of the leg 302a, the rail portions 334 form the rails 218, and the hooks 346 form the tabs 306. A second leg 302b may be formed in a similar manner, and the two legs 302 may be interlocked by positioning the rails 218 of one leg 302 adjacent the rails 218 of the other leg 302 and between the tabs 306.

In some embodiments, each leg 30 is identical, reducing the number of distinct parts needed for manufacture. Also, the bracket 210 may be formed by assembling two legs 302 each formed from an elongated stamped piece, rather than fabricating the bracket from a large stamped workpiece with a central portion removed. As a result, considerably less material is required for fabrication of the bracket 210.

The terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A bracket for supporting at least one electrical device, the bracket comprising:
   a first portion including a first flange, a pair of first coupling features, and a pair of first rails, the pair of first rails including an upper first rail and a lower first rail, the first flange configured to be secured to a first support member, the pair of first rails extending from the first flange and spaced apart from one another, the pair of first rails oriented parallel to one another, each of the pair of first rails including a first distal end and a first tab positioned adjacent the first distal end, the first tab of each of the pair of first rails protruding away from a plane of the respective first rail, the first tab of the upper first rail and the first tab of the lower first rail protruding in the same direction relative to each other, each of the pair of first coupling features positioned opposite the first distal end of a corresponding one of the pair of first rails and between the first flange and the corresponding one of the pair of first rails; and
   a second portion including a second flange, a pair of second coupling features, and a pair of second rails, the pair of second rails including an upper second rail and a lower second rail, the second flange configured to be secured to a second support member, the pair of second rails extending from the second flange and spaced apart from one another, the pair of second rails oriented parallel to one another, each of the pair of second rails including a second distal end and a second tab positioned adjacent the second distal end, the second tab of each of the pair of second rails protruding away from a plane of the respective second rail, the second tab of the upper second rail and the second tab of the lower second rail protruding in the same direction relative to each other, each of the pair of second coupling features positioned opposite the second distal end of a corresponding one of the pair of second rails and between the second flange and the corresponding one of the pair of second rails, the second tab of the upper second rail extending around an edge of the upper first rail, the first tab of the upper first rail extending around an edge of the upper second rail, the pair of second rails being slidable relative to the pair of first rails;
   wherein the first coupling feature positioned between the first flange and the upper first rail permits movement of the second tab of the upper second rail therethrough between a coupled position and an uncoupled position relative to the upper first rail.

2. The bracket of claim 1, wherein sliding movement of the pair of second rails relative to the pair of first rails is adapted to change a distance between the first flange and the second flange.

3. The bracket of claim 1, wherein each of the pair of first rails includes an elongated protrusion protruding from a surface of the respective first rail in a direction opposite the first tab, each elongated protrusion extending substantially between the first flange and the first distal end of the respective first rail.

4. The bracket of claim 1, wherein the first tab of the upper first rail is one of a pair of first tabs of the upper first rail and the upper second rail is positioned between the pair of first tabs of the upper first rail.

5. The bracket of claim 4, wherein the second tab of the upper second rail is one of a pair of second tabs of the upper second rail and each of the pair of second rails includes an elongated protrusion, wherein the pair of first tabs of the upper first rail engage side portions of the upper second rail such that the elongated protrusion of the upper second rail is positioned between the pair of first tabs of the upper first rail as the upper second rail slides relative to the upper first rail.

6. The bracket of claim 1, wherein the second tab of the upper second rail retains the upper second rail in contact with the upper first rail, thereby interlocking the upper second rail with the upper first rail.

7. The bracket of claim 1, wherein the pair of first rails and the pair of second rails are configured to support the at least one electrical device between the first flange and the second flange.

8. The bracket of claim 1, wherein each of the pair of first coupling features is a notch positioned on an edge at a connection between the first flange and the corresponding one of the pair of first rails.

9. The bracket of claim 1, wherein each of the pair of second coupling features is a notch positioned on an edge at a connection between the second flange and the corresponding one of the pair of second rails.

10. A bracket for supporting at least one electrical device, the bracket comprising:
    a first leg including a first end portion, a pair of first coupling features, and a pair of first rails connected to the first end portion, the first end portion configured to be secured to a first support member, the pair of first rails including an upper first rail and a lower first rail, the upper and lower first rails extending from the first end portion in a parallel orientation and perpendicularly offset from one another, the pair of first rails overlapping one another,
    a second leg engaging the first leg in an interlocking manner, the second leg including a second end portion and a pair of second rails connected to the second end portion, the second end portion configured to be secured to a second support member, the pair of second rails including an upper second rail and a lower second rail, the upper and lower second rails extending from the second end portion in a parallel orientation and perpendicularly offset from one another, the pair of second rails overlapping one another, wherein the pair of first rails are coupled to the pair of second rails, the pair of first rails are slidable relative to the pair of second rails, sliding movement of the pair of first rails relative to the pair of second rails is adapted to change a distance between the first end portion and the second end portion, wherein each of the pair of first rails includes a first end and a first tab extending from the first end in a first tab direction, each of the pair of first coupling features is positioned opposite the first end of a corresponding one of the pair of first rails and between the first end portion and the corresponding one of the pair of first rails, the first coupling feature positioned between the first end portion and the upper first rail is configured to permit movement of a part of the second leg therethrough between a coupled position and an uncoupled position relative to the first leg, the first tab of the upper first rail extends around a portion of the upper second rail to retain the upper first rail in sliding contact with the upper second rail.

11. The bracket of claim 10, wherein each of the pair of first rails includes an elongated protrusion protruding from a surface of the respective first rail in a direction opposite the first tab direction, each elongated protrusion extending substantially between the first end portion and the first end of the respective first rail.

12. The bracket of claim 10, wherein the first tab of the upper first rail is one of a pair of first tabs of the upper first rail, the pair of first tabs of the upper first rail are configured to position the upper second rail between the pair of first tabs of the upper first rail.

13. The bracket of claim 12, wherein each of the pair of second rails includes an elongated protrusion, wherein the pair of first tabs of the upper first rail engage side portions of the upper second rail such that the elongated protrusion of the upper second rail is positioned between the pair of first tabs of the upper first rail as the pair of first rails and the pair of second rails slide relative to each other.

14. The bracket of claim 10, wherein the first tab of each of the pair of first rails extends in the first tab direction, each of the pair of second rails includes a second end and a second tab extending from the second end, the second leg includes a pair of second coupling features each positioned between the second end portion and a corresponding one of the pair of second rails, the second coupling feature positioned between the second end portion and the upper second rail is configured to permit movement of the first tab of the upper first rail therethrough between a coupled position and an uncoupled position relative to the second leg, the second tab of the upper second rail extends around a portion of the upper first rail to retain the pair of second rails in contact with the pair of first rails, the second tab of each of the pair of second rails extends in a second tab direction opposite the first tab direction.

15. The bracket of claim 14, wherein each of the pair of second coupling features is a cutout positioned between the second end portion and the corresponding one of the pair of second rails.

16. The bracket of claim 10, wherein the pair of first rails and the pair of second rails are configured to support the at least one electrical device between the first end portion and the second end portion.

17. The bracket of claim 10, wherein each of the pair of first coupling features is a cutout positioned between the first end portion and the corresponding one of the pair of first rails.

* * * * *